United States Patent [19]

Miura et al.

[11] Patent Number: 4,626,561
[45] Date of Patent: Dec. 2, 1986

[54] METHOD OF MAKING TWO PHASE MATERIAL OF HIGH MOLECULAR WEIGHT POLYMER AND FINE PARTICLES DISPERSED THEREIN

[75] Inventors: Hirohisa Miura; Hiroshi Satou; Toshio Natsume; Hidenori Katagiri, all of Toyota, Japan

[73] Assignee: Toyota Jidosha Kabushiki Kaisha, Toyota, Japan

[21] Appl. No.: 611,547

[22] Filed: May 17, 1984

[30] Foreign Application Priority Data

Jul. 13, 1983 [JP] Japan ................................. 58-127442

[51] Int. Cl.⁴ .............................................. C08K 3/08
[52] U.S. Cl. ................................... 523/318; 524/439; 524/440; 524/441
[58] Field of Search ................ 428/328, 331; 524/439, 524/440, 441; 523/318

[56] References Cited

U.S. PATENT DOCUMENTS

| | | | |
|---|---|---|---|
| 2,460,546 | 2/1949 | Stephanoff | 523/318 |
| 2,947,646 | 8/1960 | Devaney et al. | 524/439 |
| 3,867,332 | 2/1975 | Chimura et al. | 524/440 |
| 4,284,684 | 8/1981 | Kubota | 428/328 |
| 4,302,372 | 11/1981 | Fujiwara et al. | 524/443 |
| 4,414,270 | 11/1983 | Miyoshi et al. | 428/331 |
| 4,500,669 | 2/1985 | Ashlock et al. | 524/441 |

FOREIGN PATENT DOCUMENTS 55-127461 10/1980 Japan ................................. 524/443

*Primary Examiner*—Lewis T. Jacobs
*Attorney, Agent, or Firm*—Oblon, Fisher, Spivak, McClelland, & Maier

[57] ABSTRACT

A composite material having a high molecular weight polymer material as the matrix material and extremely fine particles of diameters of the order of tens to hundreds of angstroms dispersed in the matrix material is obtained by rapidly adiabatically cooling vapor of a metallic material through a nozzle, and squirting a jet of said fine particles into a molten mass of the high molecular weight polymer material. Optionally, inert gas may be squirted through the nozzle along with the vapor of the metallic material. Further, optionally a gas which forms a compound with the metallic material may be squirted through the nozzle with vapor of the metallic material, so that the particles become particles of a compound of the metallic material and the gas.

7 Claims, 4 Drawing Figures

⊢ 500Å

METHOD OF MAKING TWO PHASE MATERIAL OF HIGH MOLECULAR WEIGHT POLYMER AND FINE PARTICLES DISPERSED THEREIN

BACKGROUND OF THE INVENTION

The present invention relates to a two phase material using a high molecular weight polymer material as a matrix material and with fine particles dispersed therein as reinforcing material, and to a method of making such a two phase material.

The present patent application is based upon and claims the priority of Japanese patent application Ser. No. 127442/83 dated July 13, 1983; and hereby the material and subject matter of said Japanese patent application are incorporated into this specification by reference; a copy of said application is appended to this specification.

It has been recognized in the past that it is possible to supplement various deficiencies of a high weight polymer material without deteriorating its good characteristics by dispersing particles of metal or a metallic compound within the high weight polymer material. (In this connection, in this specification, the word "metal" will be used to include, not only conventional metals such as copper and aluminum, but also elements which have metallic properties in certain circumstances; in particular, to include silicon). Therefore, in the prior art, attempts have been made to give the characteristics of electroconductivity or electrosemiconductivity to high molecular weight polymer materials such as plastics, elastomers, and paints by melting them (i.e. heating them to a state in which their viscosity is very low) and then infusing into them metallic particles and dispersing these metallic particles. Also, attempts have been made to give the characteristics of good rigidity and dimensional stability to plastics by melting them and then infusing and dispersing into them particles of hard metal or ceramics such as alumina and silica. In the case of such a two-phase material including a high molecular weight polymer as a matrix material and dispersed particles of metal or metal compound, in order to effectively supplement the deficiencies of the polymer without deteriorating its useful properties the particles to be mixed must be minute and uniformly dispersed in said polymer material; and further, in order to make the resulting particle dispersion composite material economically, the mixed in particles must be economically available.

However, in the prior art such particle dispersion composite materials have been made by utilizing mixed particles with diameters in the range of from one micron to tens of microns, which have been formed by mechanical breaking methods, evaporation-in-gas methods, or atomization methods. Also, the method typically used for dispersing these mixing particles in the molten polymer matrix material has been either simply to mix them mechanically, or alternatively to utilize the so called jet dispersal method in which a jet of the particles mixed with argon gas is introduced into the molten matrix material. Since particles with an average diameter of less than one micron cannot be economically produced by such mechanical breaking methods and the like, and, since the particles as described above have small surface activity and have relatively poor wettability with the molten high molecular weight polymer matrix material, the problem arises that unevenness in the mixing particle distribution inevitably tends to occur between higher and lower strata of the molten composite material, due to the difference in specific gravities between the particles and the polymer matrix material. In other words, it is very difficult or impossible to evenly distribute such particles in the matrix material by mechanical mixing or by the jet dispersal method.

SUMMARY OF THE INVENTION

In view of the above described problems with regard to two phase materials including high molecular weight polymer as matrix material and fine dispersed metal or metal compound particles as mixing material, the present Inventors have been impelled to perform various experimental researches which will be detailed later in this specification. As a result of these experiments, the Inventors have determined that it is possible to manufacture extremely fine mixing particles, either of a single metal or of a metallic compound, with diameters of several hundred angstroms or less and with very strong surface activity, by expelling metallic vapor or a mixture gas consisting of metallic vapor and another gaseous element to be combined therewith through an expansion nozzle, so as to provide adiabatic expansion and very rapid cooling; and further the Inventors have determined that it is a very effective method of evenly and finely dispersing these very fine particles in a matrix of high molecular weight polymer material to direct the jet flow from said nozzle against the surface of a mass of the molten polymer material.

Accordingly, it is the primary object of the present invention to provide a method for manufacture for a two phase material including high molecular weight polymer and dispersed particles including a metal, in which the particles are much finer than in the prior art.

It is a further object of the present invention to provide a method of manufacture for such a two phase material, in which the reinforcing particles including said metal are very evenly dispersed in the matrix of high molecular weight polymer.

It is a further object of the present invention to provide a method of manufacture for such a two phase material, in which the intimacy of the contact between the particles including said metal and the high molecular weight polymer matrix material is excellent.

It is a further object of the present invention to provide a method of manufacture for such a two phase material, in which the dispersion of the particles including said metal is excellent, even when the specific gravities of the particles and of the high molecular weight polymer matrix material are very different.

It is a further object of the present invention to provide a method of manufacture for such a two phase material, whose properties are suitably uniform.

It is a yet further object of the present invention to provide a method of manufacture for such a two phase material, which is efficient and economical.

It is a yet further object of the present invention to provide a method of manufacture for such a two phase material, which can well control the particle size.

It is a yet further object of the present invention to provide a method of manufacture for such a two phase material, which can conveniently be performed as a continuous process instead of a batch mode.

It is a concomitant object of the present invention to provide a two phase material having improved characteristics.

According to the most general aspect of the present invention, these and other objects relating to a method are accomplished by a method of making a composite material comprising a high molecular weight polymer material as matrix material and fine particles containing a metal dispersed therein, wherein vapor of said metal is rapidly cooled by being expanded through a nozzle, and a jet flow from said nozzle is directed into a mass of said high molecular weight polymer material in molten state.

According to such a method, in the case that the jet flow through the nozzle does not contain any other elemet with which the metal vapor can combine, which may be either when the jet flow through the nozzle consists only of said metal vapor or when the jet flow through the nozzle additionally contains some inert gas used as a carrier which cannot combine with the metal vapor, by the rapid cooling of said jet flow by adiabatic expansion in the nozzle, the flow impinging on the surface of the molten polymer material contains extremely fine particles of the metal with diameters in the range of a few hundreds of angstroms, which have just solidified and accordingly have extremely high surface activity. On the other hand, in the case that the jet flow through the nozzle additionally contains another gaseous element with which the metal vapor can combine, then the jet flow impinging on the surface of the molten polymer material will contain extremely fine particles of a compound of the metal with said gaseous element which have formed during the adiabatic expansion of the metal vapor and the gaseous element through the nozzle, again with diameters in the range of a few hundreds of angstroms; and in this case these compound particles have just been formed, and accordingly again have extremely high surface activity. In either case, these very active and very fine particles are entrained into the molten polymer material by impinging on the surface thereof at high speed, and become thoroughly and evenly mixed therein. Good mixing of the particles with the molten polymer material is effected by the fact that the high speed jet impinging on the surface of the molten mixture has a strong effect to churn it up and to render it uniformly mixed. Because of the high surface activity and the fineness of the particles, difference between the specific gravity of the material of the particles and the specific gravity of the molten polymer material do not cause any substantial effect of layering of the resulting two phase material. Because the fine particles are manufactured in a continous fashion and are continuously mixed into the molten polymer, there arises no problem of the fine particles sticking to one another, such as would be inevitable if the fine particles were first manufactured, and later attempts were made to stir a mass of the fine particles into the molten polymer.

Various suitable materials which have been realized for the reinforcing particles are copper, aluminum, silver, silicon carbide, silicon nitride, and aluminum nitride; and various suitable materials which have been realized for the matrix material are polycarbonate, polyethylene wax, polpropylene, and polyethylene terephthalate, and rubbers such as silicon rubber and foamed silicon rubber.

In the method of this invention, part of the thermal energy in the metallic vapor is converted into kinetic energy by the adiabatic expansion in the nozzle, and the jet flow out from the nozzle can attain a high speed of from Mach 1 to 4.

If the pressure and the temperature of the gas or gaseous mixture upstream of the nozzle are $P_1$ (in torr) and $T_1$ (in degrees K.) respectively, and the pressure and the temperature of the gas or gaseous mixture downstream of the nozzle are $P_2$ (in torr) and $T_2$ (in degrees K.) respectively, and the speed of the jet flow out of the nozzle is $M_2$ (in Mach number), then:

$$T_2 = T_1 \times (P_2/P_1)^{((K-1)/K)}$$

$$M_2 = SQRT(2/(k-1))((P_2/P_1)^{((1-K)/K)} - 1))$$

(K is the specific heat ratio of the gas body)

In the case that a convergent nozzle is used for the cooling nozzle, then the speed $M_2$ reaches Mach 1 when the nozzle outlet pressure $P_2$ reaches a critical pressure $(P_1 \times (2/(k+1))^{(2/(K-1))})$ and the speed $M_2$ does not increase beyond that, no matter how far below the pressure $P_2$ drops. On the other hand, in the case that a divergent nozzle (a so-called Laval nozzle) is used for the cooling nozzle, then the speed $M_2$ rapidly increases as $P_2/P_1$ decreases, and reaches Mach 4 when $P_2/P_1 = 1/100$. The temperature $T_1$ may be selected according to the vapor pressure of the metallic particles or the metallic compound particles which are to be dispersed in the high molecular weight polymer material. Assuming that $T_1 = 2,273$ degrees K. (2,000 degrees C.) and the specific heat ratio $k = 1.667$, then, according as to the pressure ratio $(P_2/P_1)$ reduces from 1/5 to 1/200, then the temperature $T_2$ and the speed $M_2$ of said jet flow downstream of the cooling nozzle change as shown in Table 1.

Thus, since as shown above the speed of the particles as they impinge against the surface of the molten polymer material is sonic or higher, thereby they are infused into the molten polymer material before they have the time to lose their very high surface activity which is due to their newly formed character, as explained above; and also due to this high speed of the jet flow from the nozzle the stirring of the mixture is performed very effectively. However, in order to further encourage the uniform mixing of the fine particles into the polymer material, a mechanical stirring means may be also used, as is explained later in this specification. Since part of the kinetic energy of the fine particles is converted into thermal energy as the particles impinge into the molten polymer material, it is considered to be advantageous to arrange the operational parameters of the process so that the temperature $T_2$ of the jet flow downstream of the nozzle is slightly less than the temperature of the molten polymer material, in order to maintain said molten polymer material temperature at a substantially constant level without requiring too much heating.

According to a specialization of this invention, an inert gas such as argon gas for acting as a carrier gas is added to the metallic vapor before passing it through the nozzle; or, in the case that the metallic vapor is being combined with another gaseous element, said gaseous element is provided in greater amount than can combine with the metallic vapor, so as again to function as a carrier gas. In such a case, this carrier gas has a useful effect of inducting the metallic vapor more quickly and continuously into the nozzle, and thus the metallic vapor is prevented from growing into large particles by amalgamation. Thereby, the size of the fine particles may be reduced, and variations or fluctuations in their density may be likewise reduced. Further, in this case, by controlling the flow rate of the inert gas or the excess gaseous element, the pressure ratio $P_1/P_2$ of the mixture gas flow before and after the nozzle may be advantageously easily controlled, and so the cooling speed of the mixture gas and the particle size may be controlled.

The nozzle used may be either a convergent or a divergent nozzle; but a divergent nozzle is preferred to be used, in order to increase the speed of the jet flow therefrom, and thus to promote the smallness in size and evenness in size of the particles, as well as increasing the stirring effect of the jet flow on the molten mixture.

This method of making a composite material may be readily adapted to continuous rather than batchwise operation, by causing the molten polymer material to flow at a fixed flow rate relative to the nozzle.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENTS

The present invention will now be described with reference to the preferred embodiments thereof, and with reference to the appended drawings. First, however, an apparatus related thereto will be described.

Figure 1:
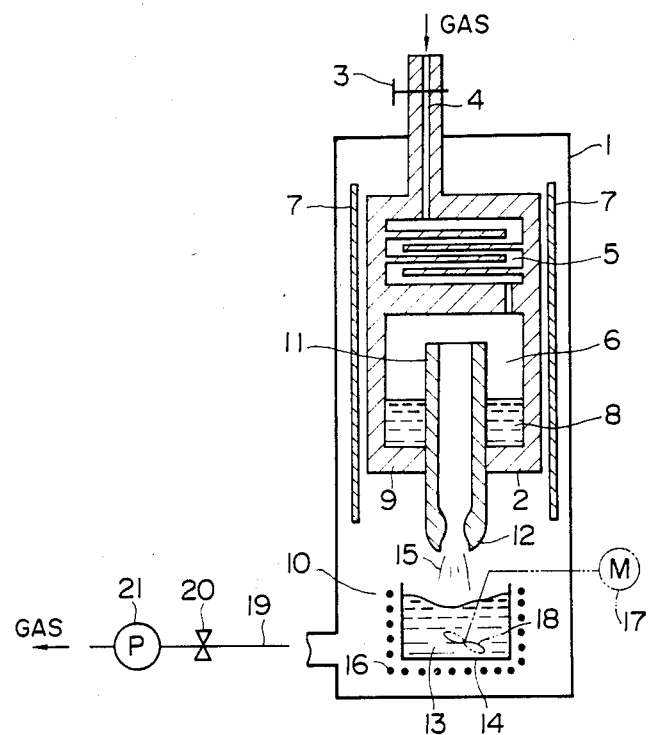
FIG. 1 is a schematic structural sectional view showing a particle dispersion high polymer material production device which is used for performing certain preferred embodiments of the method of the present invention so as to make certain of the preferred embodiments of the material of the present invention.

Referring to FIG. 1 which shows a particle dispersion high polymer material production device which is used for practicing various preferred embodiments of the method of the present invention, the reference numeral 1 denotes a furnace shell, which is formed as a substantially enclosed container; and a melting pot 2 is disposed within this furnace shell 1. This melting pot 2 comprises a gas preheating chamber 5, to which gas can be fed from the outside as will be described later via a gas introduction port 4 which is controlled by a valve 3, and further comprises a metal vapor production chamber 6 communicated with said gas preheating chamber 5. Around the melting pot 2 there is disposed a heater 7 for keeping the interiors of the gas preheating chamber 5 and of the metal vapor production chamber 6 heated up to an appropriately high temperature $T_1$; and thus metal charged into the metal production vapor chamber 6 is melted into a molten metal mass 8 and is further vaporized into metallic vapor, to fill the chamber 6 and to mix with the gas (if any) introduced through the port 4.

Through the bottom 9 of the melting pot 2 there is passed a conduit 11 for connecting the metal vapor production chamber 6 with a two phase material production zone 10 within the furnace shell 1 below the melting pot 2, and at the lower end of this conduit 11 there is provided a divergent nozzle 12. Thus, during use of the apparatus, a jet flow 15 of metal vapor, possibly mixed with introduced gas, and cooled to a temperature $T_2$, is squirted out from the nozzle 12. Below the divergent nozzle 12, to receive this jet flow 15, there is provided, in the two phase material production zone 10, a container 14 for containing a mass 13 of molten high polymer matrix material; and this container is arranged to be kept at an appropriate high temperature by a heater 16. Thus, during use of the apparatus, the surface of this molten matrix material mass 13 is impinged upon by the jet flow 15 of metal vapor. The molten mass 13 may be stirred up by a propeller 18 which is driven by a motor 17; in fact, this is not done in the case of all the preferred embodiments, and so these elements are shown by double dotted lines to indicate that they are optional. A vacuum pump 21 is connected to the two phase material production zone 10 via a valve 20 and a conduit 19, so as to keep the zone 10 and the metal production vapor chamber 6 evacuated to desired pressures, which will hereinafter be designated as $P_2$ and $P_1$ respectively.

First Embodiment

A two phase material including high molecular weight polymer as a matrix material and dispersed metal particles, in which the particles were copper particles and the matrix material was polycarbonate, was manufactured using the apparatus described above, as follows.

First, a mass of approximately 50 gm of metallic copper (tough pitch copper, purity 99.9%) was charged into the melting pot 2 in the metal vapor production chamber 6, and then a flow of argon gas was provided to the gas introduction port 4 and flowed into the metal vapor production chamber 6 by way of the gas preheating chamber 5, under the control of the valve 3. Meanwhile the metallic copper mass was rapidly melted into a mass of molten copper 8 by operation of the heater 7, till the temperature $T_1$ in the metal vapor production chamber 6 reached approximately 1700° C.

Then, the mixture gas in the metal vapor production chamber 6 passed into the conduit 11 and downwards therein, to be squirted out of the divergent nozzle 12 into the two phase material production zone 10. At this time, the valve 3, the vacuum pump 21 and the valve 20 were so regulated as to keep the pressure $P_1$ in the metal vapor production chamber 6 at approximately 10 torr, and the pressure $P_2$ in the zone 10 at approximately 0.3 to 0.4 torr. According to this, the mixture gas of copper vapor and argon which had passed through the divergent nozzle 12 and had been cooled by rapid adiabatic expansion therethrough was cooled to a temperature $T_2$ of approximately 250° C. or less, and was thus turned into a jet of extremely minute particles of solidified copper carried along on a jet of argon gas. This jet impinged on the surface of a pool 13 of molten polycarbonate which was held in the container 14 and was maintained at a temperature of $T_3$ equal to approximately 270° to 300° C. by means of the heater 16. Thus, the fine particles of solidified copper were largely entrained into the molten polycarbonate, while the argon gas was continually carried away by the vacuum pump 21. In this first preferred embodiment, no motor 17 or propeller 18 were used for stirring the molten polycarbonate up at this time.

Figure 2:
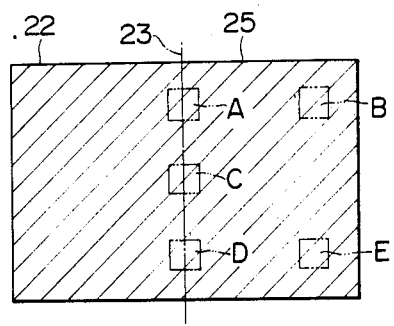
FIG. 2 is an illustrative vertical sectional view showing a solidified body of particle dispersion high polymer material which is a preferred embodiment of the product according to the present invention, produced according to certain of the preferred embodiments of the method of the present invention.

After this process was performed for an appropriate time, the heaters 7 and 13 were turned off, and, after the resulting mass of polycarbonate mixed with copper particles had completely solidified in the container 14, the container 14 was taken out from the furnace shell 1, and the mass of composite material was removed from the container 14: this composite material mass was generally formed as a column which had a diameter of approximately 150 mm and a height of approximately 50 mm. Then, as indicated in FIG. 2, three cubic samples A, C, and D, each approximately 10 mm on a side, were cut from this composite material column substantially on its central axis and at approximate depths from its upper surface of 10 mm, 25 mm, and 40 mm respectively; and two other cubic samples B and E, each also approximately 10 mm on a side, were cut from regions of the composite material column at radial distances of approximately 10 mm from its central axis and at depths from its upper surface of approximately 10 mm and 40 mm respectively.

Figure 3:
FIG. 3 is a transmission electron microscope photograph of a particle dispersion high polymer material using copper particles as the dispersion material and polycarbonate as the matrix material, which is a particular preferred embodiment of the material according to the present invention.

For each of these samples A, B, C, D, and E the weight percentage of copper particles, the range of particle diameters, and the average particle diamters were measured. The results are shown in Table 2, in its Column I. In FIG. 3, a transmission type electron microscope photograph of a portion of sample A is shown: the dots are the copper particles, and the other portion is the polycarbonate.

It is thus clear that according to this first embodiment of the method of the present invention that the copper particles were produced to be of extremely small size to be from 30 to 350 angstroms, and that these particles were mixed in with the polycarbonate in substantially uniform fashion through the entire extent of the polycarbonate, both with regard to its vertical dimension, as evidenced by the comparison of the weight percentage of copper particles between the three sample pieces A, C, and D, and with regard to its radial dimension, as evidenced by comparison of these pieces with the two sample pieces B and E.

Modification One

Another type of two phase material was manufactured as a modification of the first embodiment, using the apparatus described above, from the same combination of two materials, in the same way as the first preferred embodiment described above, except that a motor 17 and a propeller 18 as shown in FIG. 1 by the double dotted lines were used for stirring the molten polycarbonate up during the infusion of the copper particles thereinto from the jet flow 15.

Again, five cubic samples A, B, C, D, and E just as before were cut from the composite material column, and the weight percentage of copper particles, the range of particle diameters, and the average particle diameter were measured. The results are shown in Table 2, in the column II. Comparison of columns I and II will show that the stirring was moderately helpful for yet further promoting the mixing of the reinforcing copper particles in a substantially uniform fashion through the entire extent of the polycarbonate.

Modification Two

Figure 4:
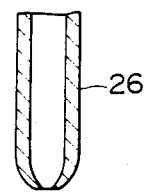
FIG. 4 is a partial longitudinal sectional view showing a convergent type nozzle, which can be used as an alternative type of cooling nozzle in the device shown in FIG. 1 for performing certain of the preferred embodiments of the method of the present invention.

Still another type of two phase material was manufactured as another modification of the first embodiment, using the apparatus described above, from the same combination of two materials, in the same way as the first preferred embodiment described above, except that a convergent nozzle 26 as shown in section in FIG. 4 was used for passing the jet flow 15 through to squirt it into the two phase material production zone 10, instead of the divergent nozzle 12 of the first preferred embodiment. Again, five cubic samples were cut from the composite material column located as before, and for each of these samples A, B, C, D, and E the weight percentage of copper particles, the range of particle diameters, and the average particle diameter, were measured. The results are shown in Table 2, in its column III. The average particle diameter was now approximately 300 angstroms. Further, as apparent from Table 2, the distribution of the particles in the matrix as less uniform than in the first embodiment. However, this embodiment of the present invention which employs a convergent nozzle as a cooling nozzle was considered to be still effective for promoting mixing of copper as minute particles in a substantially uniform fashion through the entire extent of the polycarbonate, when compared with the conventional methods.

Modification Three

Still another type of two phase material was manufactured as another modification of the first embodiment, using the apparatus described above, from the same combination of two materials, in the same way as the first preferred embodiment described above, except that no argon gas was mixed into the copper vapor in the metal vapor production chamber 6, but instead the jet flow 15 was pure copper vapor. Again, five cubic samples were cut from the composite material column located as before, and for each of these samples A, B, C, D, and E the weight percentage of copper particles, the range of particle diameters, and the average particle diameters were measured. The results are shown in Table 2, in its column IV. Comparison of the data in columns I and IV will show us the effect of the argon gas used as a carrier for the copper vapor. Howeve, still again, this fourth embodiment of the present invention was still considered to be effective for promoting mixing of copper particles in a substantially uniform fashion through the entire extent of the polycarbonate, when compared with the conventional methods.

Second Embodiment

Another type of two phase material including high molecular weight polymer as a matrix material and dispersed metal particles was manufactured using the apparatus described above, in a similar manner to the first preferred embodiment described above, but using polyethylene wax as the high molecular weight polymer matrix material and again copper as the material for the particles. The production conditions in this second preferred embodiment were as follows: the material charged in the melting pot 2 was approximately 50 gm of copper; the introduced gas through the gas introduction port 4 was argon gas; the temperature $T_1$ was approximately 1750° C.; pressure $P_1$ was approximately 20 torr; temperature $T_2$ was approximately 50° C. or less; pressure $P_2$ was approximately 0.2 torr; and temperature $T_3$ was approximately 120° C. to 150° C.

Again, five cubic samples were cut from the resulting composite material column located as before, and for each of these samples A, B, C, D, and E the weight percentage of copper particles, the range of particle diameters, and the average particle diameters were measured. The results are shown in Table 3, in its column I. The average particle diameter was now approximately 180 angstroms. This shows that, also in this case of using polyethylene wax as the matrix material, the method according to the present invention was effective for promoting mixing of the copper as minute particles in a substantially uniform fashion through the entire extent of said polyethylene wax.

In Table 3, the data in its columns II, III, and IV shows the results of modifications with regard to the second embodiment of the same kinds as those modifications made with regard to the first embodiment. From these data, it will be appreciated that the same kinds of modifications to the method of the second embodiment produced the same kinds of differences with regard to the distribution of particles in the matrix body, the range of particle diameters, and the average particle diameters in the two phase materials obtained, as in the first embodiment.

Third Embodiment

Another type of two phase material including high molecular weight polymer as a matrix material and dispersed metal particles was manufactured using the apparatus described above, in a similar manner to the first preferred embodiment described above, but using polypropylene as the high molecular weight polymer matrix material and aluminum as the material for the particles. The production conditions in this third embodiment were as follows: the material charged in the melting pot 2 was approximately 35 gm of aluminum; the introduced gas through the gas introduction port 4 was argon gas; temperature $T_1$ was approximately 1700° C.; pressure $P_1$ was approximately 10 torr; temperature $T_2$ was approximately 180° C. or less; pressure $P_2$ was approximately 0.2 to 0.3 torr; and temperature $T_3$ was approximately 200° C. to 230° C.

Again, five cubic samples were cut from the resulting composite material column located as before, and for each of these samples A, B, C, D, and E the weight percentage of aluminum particles, the range of particle diameters, and the average particle diameter were measured. The results are shown in Table 4, in its column I. Also, in Table 4, the data in its columns II, III, and IV show the results of modifications with regard to the third embodiment of the same kinds as those modifications made with regard to the first embodiment. The appreciation of these data will be clear to one of ordinary skill in the art.

Fourth Embodiment

Another type of two phase material including high molecular weight polymer as a matrix material and dispersed metal particles was manufactured using the apparatus described above, in a similar manner to the first preferred embodiment described above, but using polyethylene terephthalate as the high molecular weight polymer matrix material and aluminum as the material for particles. The production conditions in this fourth embodiment were as follows: the material charged in the melting pot 2 was approximately 35 gm of aluminum; the introduced gas through the gas introduction port 4 was argon gas; temperature $T_1$ was approximately 1700° C.; pressure $P_1$ was approximately 10 torr; temperature $T_2$ was approximately 180° C.; pressure $P_2$ was approximately 0.2 to 0.3 torr; and temperature $T_3$ was approximately 270° C. to 300° C.

Again, five cubic samples were cut from the resulting composite material column located as before, and for each of these samples A, B, C, D, and E the weight percentage of aluminum particles, the range of particle diameters, and the average particle diameter were measured. The results are shown in Table 5, in its column I. Again also in Table 5, the data in its columns II, III, and IV show the results of modifications with regard to the fourth embodimnet of the same kinds as those modifications made with regard to the first embodiment. Still again the appreciation of these data will be clear to one of ordinary skill in the art.

Fifth Embodiment

A two phase material including high molecular weight polymer as a matrix material and dispersed metal compound particles, in which the particles were silicon nitride particles and the matrix material was polycarbonate, was manufactured using the apparatus described above, as follows.

First, a mass of approximately 50 gm of silicon was charged into the melting pot 2, and then a flow of nitrogen gas was provided to the gas introduction port 4 and flowed into the metal vapor production chamber 6 by way of the gas preheating chamber 5, under the control of the valve 3. Meanwhile the silicon mass was rapidly melted into a mass of molten silicon 8 by operation of the heater 7, till the temperature $T_1$ in the chamber 6 reached approximately 2100° C. Then, the mixture gas in the metal vapor production chamber 6 passed into the conduit 11 and downwards therein, to be squirted out of the divergent nozzle 12 into the two phase material production zone 10. At this time, the valve 3, the vacuum pump 21 and the valve 20 were so regulated as to keep the pressure $P_1$ in the metal vapor production chamber 6 was adjusted to be at approximately 20 torr, and the pressure $P_2$ in the zone 10 at approximately 0.1 torr. As this occurred, the silicon and the nitrogen reacted together, to form minute particles of silicon nitride, and thus the jet flow 15 turned into a fine mist of minute particles of silicon nitride being carried along by the flow of excess nitrogen gas. This misty mixture of silicon nitride particles and nitrogen which had passed through the divergent nozzle 12 and had been cooled by rapid adiabatic expansion therethrough had been cooled to a temperature $T_2$ of approximately 240° C. This jet impinged on the surface of a pool 13 of molten polycarbonate which was held in the container 14 and was maintained at a temperature of $T_3$ equal to approximately 270° to 300° C. by means of the heater 16. Thus, the fine particles of solidified silicon nitride were largely entrained into the molten polycarbonate, while the excess nitrogen gas was continually carried away by the vacuum pump 21. In this fifth embodiment, no motor 17 or propeller 18 were used for stirring the molten polycarbonate up.

After this process was performed for an appropriate time, the heaters 7 and 13 were turned off, and, after the resulting mass of polycarbonate mixed with silicon nitride particles had completely solidified in the container 14, the container 14 was taken out from the furnace shell 1, and the mass of composite material was removed from the container 14: this composite material mass again was generally formed as a column which had a diameter of approximately 150 mm and a height of approximately 50 mm. Then, as before, five cubic samples were cut from the composite material column located as before, and for each of these samples A, B, C, D, and E the weight percentage of silicon nitride particles, the range of particle diameters, and the aveage particle diameter were measured. The results are shown in Table 6, in its column I. The data in its columns II and III show the results of modifications with regard to the fifth embodiment of the same kind as the modifications shown in columns II and III of Table 2 with regard to the first embodiment.

Sixth Embodiment

Another type of two phase material including high molecular weight polymer as a matrix material and dispersed metal compound particles was manufactured using the apparatus described above, in a similar manner to the fifth embodiment described above, but using polyethylene wax as the high molecular weight polymer matrix material, silicon as the material charged in the melting pot 2, and methane gas as the gas to be supplied to the gas introduction port 4. The production conditions in this sixth embodiment were as follows: the material charged in the melting pot 2 was approximately 80 gm of silicon; the introduced gas through the gas introduction port 4 was methane gas; temperature $T_1$ was approximately 2100° C.; pressure $P_1$ was approximately 20 torr; temperature $T_2$ was approximately 150° C. or less; pressure $P_2$ was approximately 0.03 to 0.05 torr; and temperature $T_3$ was approximately 120° C. to 150° C.

Again, five cubic samples were cut from the resulting composite material column located as before, and for each of these samples A, B, C, D, and E the weight percentage of silicon carbide particles, the range of particle diameters, and the average particle diameters were measured. The results are shown in Table 7, in its column I. Also the data in its column II and III show the results of modifications with regard to the sixth embodiment of the same kind as the modifications with regard to the fifth embodiment.

From these various embodiments described above, it can be seen that according to the method of the present invention it is possible to disperse extremely fine metallic particles or metal compound particles into high molecular weight polymer material in a uniform manner. Indeed, if it had been attempted to mix such extremely fine metallic particles or metallic compound particles by any of the prior art methods into molten high molecular weight polymer material, they would have inevitably coagulated together into lumps and been incapable of mixing properly therewith. It is also seen from some of the above modifications with regard to the above embodiments that stirring of the molten polymer material during the dispersion process for the fine particles therein is effective for further promoting the evenness and uniformity of dispersal of the fine particles. Further, in the case that a convergent nozzle is used for the nozzle for providing adiabatic cooling for the metal vapor from the melting pot 2 (possibly mixed with an inert or a reacting gas), it is seen from some of the above modifications that the particles of reinforcing material become far larger than otherwise, but still these particles are much smaller than any that have been utilized in the conventional methods, and the good advantages of the present invention are still available.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

TABLE 1

| $P_2/P_1$ | 1/5 | 1/10 | 1/20 | 1/50 | 1/100 | 1/200 |
|---|---|---|---|---|---|---|
| $T_2$(°K.) | 1194 | 905 | 686 | 475 | 360 | 273 |
| $M_2$(Mach) | 1.65 | 2.13 | 2.64 | 3.37 | 3.99 | 4.69 |

TABLE 2

| PARTICLE PARAMETERS | | I | II | III | IV |
|---|---|---|---|---|---|
| STUFFING | SAMPLE A | 3.7 | 3.6 | 3.5 | 3.4 |
| DENSITY | SAMPLE B | 3.9 | 3.8 | 3.7 | 3.5 |
| (wt. %) | SAMPLE C | 3.6 | 3.6 | 3.2 | 3.0 |
| | SAMPLE D | 3.5 | 3.7 | 2.9 | 3.1 |
| | SAMPLE E | 3.8 | 3.5 | 3.0 | 3.2 |
| PARTICLE DIAMETERS (angstrom) | | 30–350 | 30–350 | 70–600 | 50–400 |
| AVERAGE PARTICLE DIAMETER (angstrom) | | 150 | 150 | 300 | 230 |

TABLE 3

| PARTICLE PARAMETERS | | I | II | III | IV |
|---|---|---|---|---|---|
| STUFFING | SAMPLE A | 8.5 | 8.5 | 8.5 | 8.6 |
| DENSITY | SAMPLE B | 8.7 | 8.8 | 8.6 | 8.5 |
| (wt. %) | SAMPLE C | 8.4 | 8.6 | 8.2 | 8.3 |
| | SAMPLE D | 8.6 | 8.9 | 8.1 | 7.9 |
| | SAMPLE E | 8.5 | 8.6 | 7.8 | 8.2 |
| PARTICLE DIAMETERS (angstrom) | | 60–320 | 60–320 | 80–600 | 70–450 |
| AVERAGE PARTICLE DIAMETER (angstrom) | | 180 | 180 | 350 | 280 |

TABLE 4

| PARTICLE PARAMETERS | | I | II | III | IV |
|---|---|---|---|---|---|
| STUFF- | SAMPLE A | 10.1 | 10.2 | 10.3 | 10.6 |
| ING | SAMPLE B | 10.3 | 10.3 | 10.2 | 10.3 |
| DENSITY | SAMPLE C | 10.2 | 10.1 | 9.9 | 10.4 |
| (wt. %) | SAMPLE D | 10.2 | 10.3 | 9.6 | 10.2 |
| | SAMPLE E | 10.1 | 10.1 | 9.8 | 10.7 |
| PARTICLE DIAMETERS (angstrom) | | 50–250 | 50–250 | 200–520 | 120–350 |
| AVERAGE PARTICLE DIAMETER (angstrom) | | 120 | 120 | 300 | 180 |

TABLE 5

| PARTICLE PARAMETERS | | I | II | III | IV |
|---|---|---|---|---|---|
| STUFFING DENSITY (wt. %) | SAMPLE A | 7.4 | 7.8 | 7.9 | 6.9 |
| | SAMPLE B | 7.5 | 7.5 | 7.5 | 7.4 |
| | SAMPLE C | 7.5 | 7.6 | 7.2 | 6.8 |
| | SAMPLE D | 7.6 | 7.5 | 7.1 | 7.0 |
| | SAMPLE E | 7.7 | 7.7 | 7.8 | 7.2 |
| PARTICLE DIAMETERS (angstrom) | | 50–250 | 50–250 | 200–520 | 120–350 |
| AVERAGE PARTICLE DIAMETER (angstrom) | | 120 | 120 | 300 | 180 |

TABLE 6

| PARTICLE PARAMETERS | | I | II | III |
|---|---|---|---|---|
| STUFFING DENSITY (wt. %) | SAMPLE A | 12.1 | 11.8 | 11.5 |
| | SAMPLE B | 12.4 | 11.9 | 10.8 |
| | SAMPLE C | 12.1 | 11.8 | 11.2 |
| | SAMPLE D | 12.5 | 11.6 | 11.4 |
| | SAMPLE E | 12.2 | 11.6 | 10.9 |
| PARTICLE DIAMETERS (angstrom) | | 30–200 | 30–200 | 90–450 |
| AVERAGE PARTICLE DIAMETER (angstrom) | | 90 | 90 | 260 |

TABLE 7

| PARTICLE PARAMETERS | | I | II | III |
|---|---|---|---|---|
| STUFFING DENSITY (wt. %) | SAMPLE A | 8.6 | 8.5 | 8.3 |
| | SAMPLE B | 8.3 | 8.3 | 8.5 |
| | SAMPLE C | 8.4 | 8.2 | 7.8 |
| | SAMPLE D | 8.2 | 8.4 | 7.4 |
| | SAMPLE E | 8.4 | 8.3 | 7.6 |
| PARTICLE DIAMETERS (angstrom) | | 30–280 | 30–280 | 130–500 |
| AVERAGE PARTICLE DIAMETER (angstrom) | | 130 | 130 | 300 |

What is claimed is:

1. A method of making a composite material comprising a high molecular weight polymer material as matrix material and fine particles containing a metal dispersed therein, wherein vapor of said metal is rapidly cooled by being expanded through a nozzle, and a jet flow from said nozzle is directed into a mass of said high molecular weight polymer material in molten state.

2. A method according to claim 1, wherein vapor of said metal is introduced to said nozzle, and wherein said jet flow from said nozzle consists substantially only of said metal.

3. A method according to claim 1, wherein said jet flow from said nozzle consists substantially of said metal and an inert gas.

4. A method according to claim 1, wherein said fine particles are a compound of said metal.

5. A method according to claim 4, wherein said metal compound is a compound of said metal and a gas with which said metal can combine, and wherein said jet flow from said nozzle comprises said metal compound and said gas.

6. A method according to claim 1, wherein said nozzle is a divergent nozzle.

7. A method according to claim 1, wherein the molten mass of said high molecular weight polymer material is stirred up by a propeller means as said jet flow impinges thereon.

* * * * *